(12) United States Patent
Lin

(10) Patent No.: US 8,651,764 B2
(45) Date of Patent: Feb. 18, 2014

(54) QUICK RELEASE EXTENSION ROD WITH A POSITIONING STRUCTURE

(76) Inventor: Ying-Mo Lin, Nantou County (TW)

( * ) Notice: Subject to any disclaimer, the term of this patent is extended or adjusted under 35 U.S.C. 154(b) by 120 days.

(21) Appl. No.: 13/405,206

(22) Filed: Feb. 24, 2012

(65) Prior Publication Data

US 2013/0149027 A1  Jun. 13, 2013

(30) Foreign Application Priority Data

Dec. 9, 2011 (TW) .................................. 100145498

(51) Int. Cl.
*F16B 21/00* (2006.01)
(52) U.S. Cl.
USPC ..................................... 403/322.2; 81/177.85
(58) Field of Classification Search
USPC ........... 403/322.2, 325, 327; 81/177.1, 177.2, 81/177.85
See application file for complete search history.

(56) References Cited

U.S. PATENT DOCUMENTS

| | | | | |
|---|---|---|---|---|
| 1,864,466 A * | 6/1932 | Peterson | ..................... | 81/177.85 |
| 4,781,085 A * | 11/1988 | Fox, III | ..................... | 81/177.85 |
| 4,817,476 A * | 4/1989 | Karge | ..................... | 81/177.85 |
| 7,121,951 B2 * | 10/2006 | Chang | ..................... | 403/322.2 |
| 8,146,461 B1 * | 4/2012 | Su | ..................... | 81/177.85 |
| 2004/0126182 A1 * | 7/2004 | Lin | ..................... | 403/322.2 |

* cited by examiner

*Primary Examiner* — Michael P Ferguson
(74) *Attorney, Agent, or Firm* — Shia Banger

(57) ABSTRACT

A quick release extension rod with a positioning structure comprises a body, a return member, an inserting rod, an even number of balls, a positioning ring, a control ring assembly, four elastic members and a C-shaped retainer. The balls are disposed on the connecting head of the inserting rod, so that the radial interval between the socket and the connecting head of the base of the quick release extension rod can be evenly distributed. When the socket rotates, the arrangement of an even number of balls can reduce the possibility of the asymmetrical-center-of-gravity caused oscillation. The four elastic members are disposed between the control ring assembly and the body to push the socket can be abutted against the control ring assembly to delimitate the axial interval, which further stabilize the center of gravity of rotation of the socket while preventing the occurrence of oscillation of the socket.

8 Claims, 8 Drawing Sheets

QUICK RELEASE EXTENSION ROD WITH A POSITIONING STRUCTURE

BACKGROUND OF THE INVENTION

1. Field of the Invention

The present invention relates to a quick release extension rod, and more particularly to a quick release extension rod with a positioning structure.

2. Description of the Prior Art

FIGS. 1A and 1B show a conventional quick release extension rod A, a body 10 of the extension rod A is formed at the end thereof with a connecting head 11, between the connecting head 11 and the rod is connected a positioning control device 12. The connecting head 11 is formed in a lateral surface thereof with a positioning hole 111 in which being disposed a ball 112. A pin 13 is inserted in the connecting head 11, one end of the pin 13 is formed with an avoiding groove 131 located corresponding to the positioning hole 111 of the connecting head 11, and the other end of the pin 13 is connected to the positioning control device 12. Pushing the positioning control device 12 can selectively make the avoiding groove 131 of the positioning control device 12 be misaligned or aligned with the positioning hole 111 of the connecting head 11, so that the ball 112 will be connected to or disengaged from a socket B by projecting into an engaging cavity B1 of the socket B or retracting into the positioning hole 111.

It is to be noted that the operation of the conventional quick release extension rod A is such that when the socket B is connected to a work head, the body 10 is driven manually or by power means to rotate the socket B, and meanwhile, the socket B rotates the work head. Therefore, the reliability of the connection between the socket B and the quick release extension rod A is very important to the working efficiency of the extension rod A driving the work head.

However, as shown in FIG. 1B, the axial direction of the body 10 of the extension rod A is defined as X, and the radial direction perpendicular to the axial direction X is defined as Y. A radial interval S1 is left between the socket B and the connecting head 11 of the quick release extension rod A after they are jointed to each other, and there is also an axial interval S2 left between the socket B and the positioning control device 2. When the quick release extension rod A is locked to the socket B by the ball 112 and rotates, the center of gravity of rotation of the socket B is likely to be asymmetrical, which will increase the centrifugal force of the socket B and result in oscillation.

The present invention has arisen to mitigate and/or obviate the afore-described disadvantages.

SUMMARY OF THE INVENTION

The primary object of the present invention is to provide a quick release extension rod with a positioning structure capable of eliminating the axial and radial intervals of the conventional quick release extension rod.

To achieve the above object, a quick release extension rod with a positioning structure in accordance with the present invention comprises a body, a return member, an inserting rod, an even number of balls, a positioning ring, a control ring assembly, four elastic members and a C-shaped retainer.

The body includes a driving end and an engaging end and has an axial direction and a radial direction. The engaging end of the body is formed with a connecting head. Between the connecting head and the body is formed a shoulder portion, and in the connecting head is formed an assembling hole extending in the axial direction. In a middle of the body is formed a penetrating hole, in the connecting head is formed at least one through hole, and the penetrating hole and the through hole extend in the radial direction and are in communication with the assembling hole. Between the shoulder portion and the penetrating hole of the body is formed an annular groove.

The return member is disposed at a bottom of the assembling hole of the body.

The inserting rod has one end of the inserting rod formed with a radial hole and inserted in the assembling hole of the body in such a manner that the inserting rod is pressed against the return member and the radial hole is aligned with the penetrating hole of the body. Another end of the inserting rod is formed with a conical surface which is inserted in the through hole of the body.

The even number of balls is disposed in the through hole of the body and abutted against the inserting rod.

The positioning ring has one end formed with an assembling section in the form of an annular recess and is sleeved on the body with the assembling section facing the engaging end of the body.

The interior of the control ring assembly is a two-step hole configuration consisting of an assembling aperture and an engaging aperture. The engaging aperture is formed in an inner surface thereof with four receiving grooves extending in the axial direction. The control ring assembly is sleeved on the body in such a manner that an inner surface of the assembling aperture is abutted against an outer surface of the assembling section of the positioning ring. The inner surface of the assembling aperture is formed with a slanting rib located adjacent to the engaging aperture and an annular groove located adjacent to the positioning ring. A pin is inserted through the penetrating hole of the body and has both ends received in the annular groove. The shoulder portion of the body is stopped against a bottom of the assembling aperture, and the connecting head is inserted in the engaging aperture of the control ring assembly.

The four elastic members are received in the four receiving grooves of the control ring assembly and pressed against the bottom of the receiving grooves.

The C-shaped retainer is engaged in the annular groove of the body and located between the slanting rib and the engaging aperture in such a manner that the C-shaped retainer expands so as to press against an inner surface of the control ring assembly.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1A:
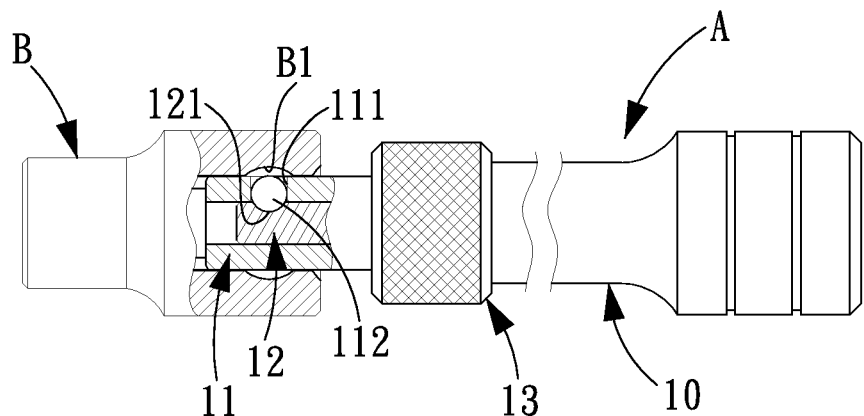
FIG. 1A is a perspective view showing that a conventional quick release extension rod is engaged with a socket.
Figure 1B:
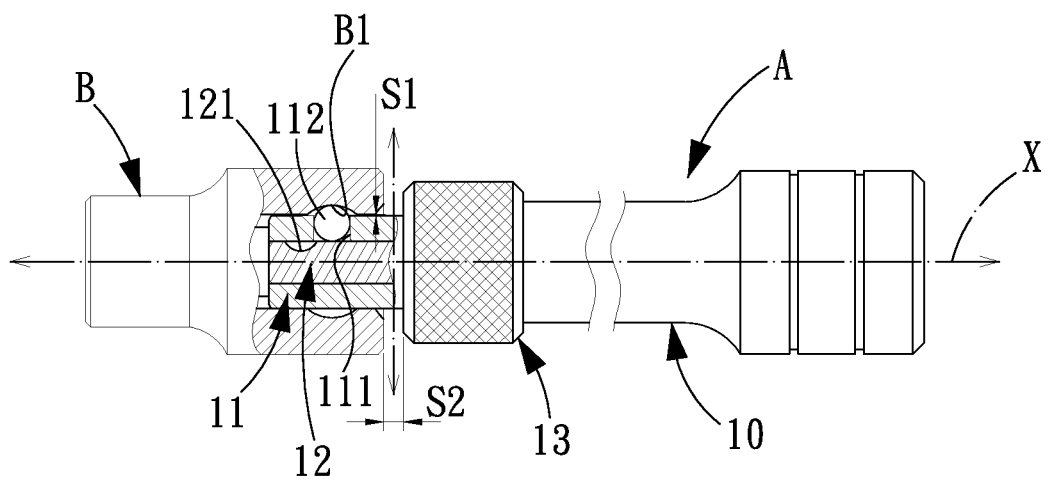
FIG. 1B is another perspective view showing that the conventional quick release extension rod is disengaged from the socket.
Figure 2:
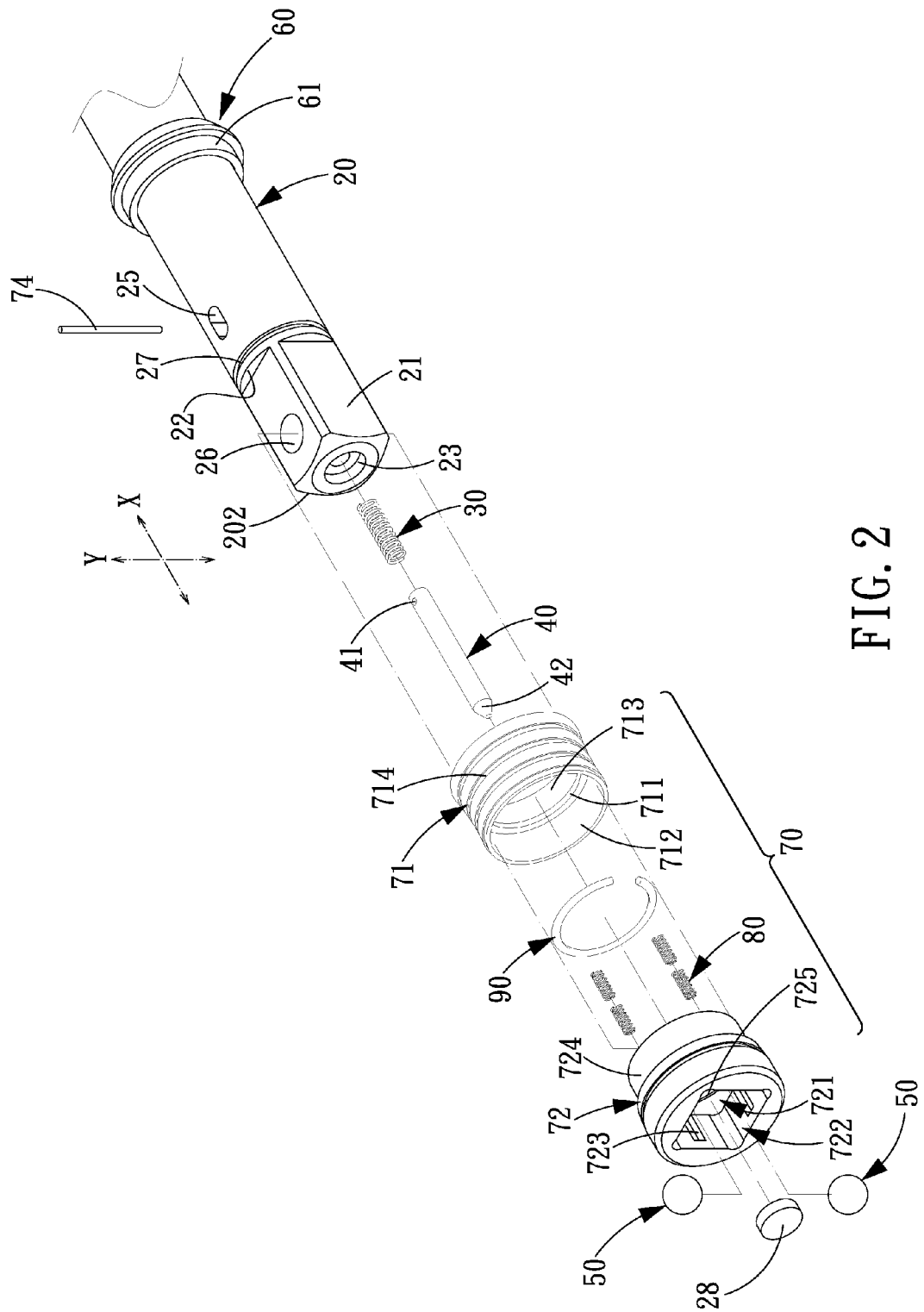
FIG. 2 is an exploded view of a quick release extension rod with a positioning structure in accordance with the present invention.
Figure 3:
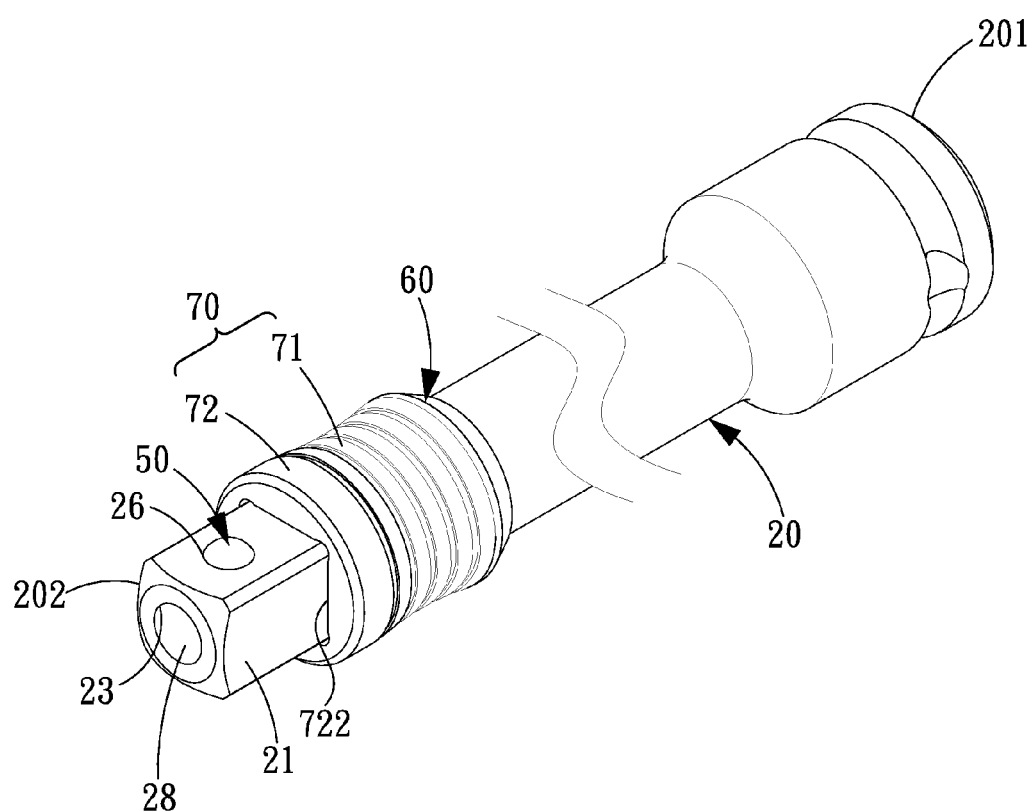
FIG. 3 is an assembly view of the quick release extension rod with a positioning structure in accordance with the present invention.
Figure 4:
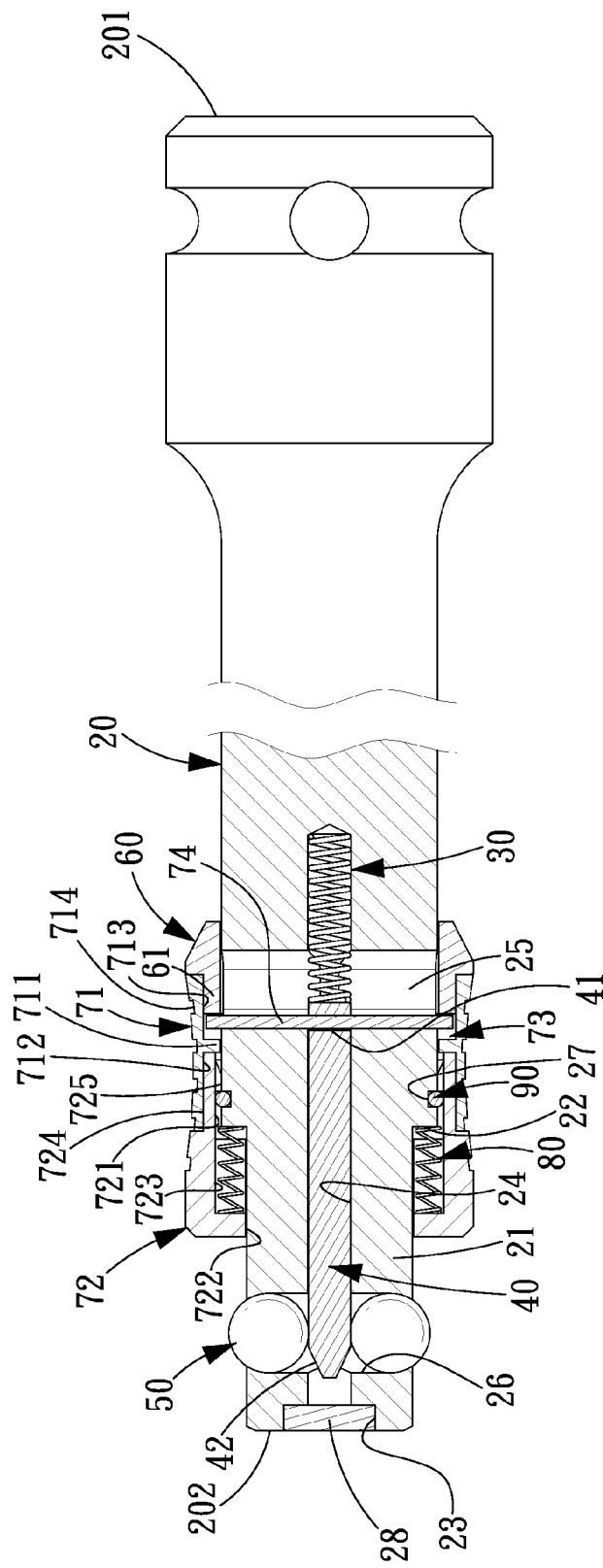
FIG. 4 is a cross sectional view taken along the line 4-4 of FIG. 3.

Referring to FIGS. 2-4, a quick release extension rod with a positioning structure in accordance with a preferred embodiment of the present invention comprises: a body 20, a return member 30, a inserting rod 40, an even number of balls 50, a positioning ring 60, a control ring assembly 70, four elastic members 80 and an C-shaped retainer 90.

The body 20 includes a driving end 201 and an engaging end 202, and has an axial direction X and a radial direction Y. The engaging end 202 of the body 20 is formed with a connecting head 21 in the form of a quadrangle pillar. A middle portion of the body 20 is circular-shaped in cross section and formed with a shoulder portion 22 which is located between the connecting head 21 and the body 20. In the end surface of the connecting head 21 is formed an engaging hole 23, and in the bottom of the engaging hole 23 is an assembling hole 24 extending in the X direction. In the middle of the body 20 is formed a penetrating hole 25, in the connecting head 21 is formed a through hole 26, and the holes 25, 26 extend in the radial direction Y and are in communication with the assembling hole 24. Between the shoulder portion 22 and the penetrating hole 25 of the body 20 is formed an annular groove 27.

The return member 30 is a spiral spring disposed at the bottom of the assembling hole 24 of the body 20.

The inserting rod 40 has one end formed with a radial hole 41 and inserted in the assembling hole 24 of the body 20 in such a manner that the inserting rod 40 is pressed against the return member 30 and the radial hole 41 is aligned with the penetrating hole 25 of the body 20. Another end of the inserting rod 40 is formed with a conical surface 42 which is inserted in the through hole 26 of the body 20.

The balls 50 are disposed in the through hole 26 of the body 20 and abutted against the inserting rod 40. As shown in FIGS. 2 and 4, there are two balls 50 are located at both ends of the through hole 26.

The positioning ring 60 has one end formed with an assembling section 61 in the form of an annular recess and is sleeved on the body 20 with the assembling section 61 facing the engaging end 202 of the body 20.

The inside of the control ring assembly 70 is a two-step hole configuration consists of an assembling aperture 721 and an engaging aperture 722. The engaging aperture 722 is formed in the inner surface thereof with four receiving grooves 723 extending in the axial direction X. The control ring assembly 70 is sleeved on the body 20 in such a manner that the inner surface of the assembling aperture 721 is abutted against the outer surface of the assembling section 61 of the positioning ring 60. The inner surface of the assembling aperture 721 is formed with a slanting rib 725 located adjacent to the engaging aperture 722 and an annular groove 73 located adjacent to the positioning ring 60. A pin 74 is inserted through the penetrating hole 25 of the body 20 and the radial hole 41 of the inserting rod 40 and has both ends received in the annular groove 73. The shoulder portion 22 of the body 20 is stopped against the conjunction between the assembling aperture 721 and the engaging aperture 722, and the connecting head 21 is inserted in the engaging aperture 722 of the control ring assembly 70. The engaging aperture 722 is also quadrangle-shaped to fit the connecting head 21.

The four elastic members 80 are received in the four receiving grooves 723 of the control ring assembly 70 and pressed against the bottom of the receiving grooves 723 and the shoulder portion 22 of the body 20 to provide an elastic force pushing the control ring assembly 70 to move toward the engaging end 202 of the body 20 until the control ring assembly 70 is pushed against the socket B.

The C-shaped retainer 90 is engaged in the annular groove 27 of the body 20 and located between the slanting rib 725 and the engaging aperture 722 in such a manner that the C-shaped retainer 90 expands so as to press against the inner surface of the control ring assembly 70.

By the abovementioned arrangements, the control ring assembly 70 is fixed by pressing against the positioning ring 60, thus the pin 74 can be driven to push the inserting rod 40 to move within the assembling hole 24 of the body 20 so as to make the balls 50 retract into or project out of the through hole 26, and as a result, the socket B is connected to or disconnected from the quick release extension rod A.

Furthermore, the control ring assembly 70 comprises a push ring 71 and an engaging member 72.

The push ring 71 includes a rib 711 formed in the inner surface thereof to divide the inner surface of the push ring 71 into a front section 712 and a rear section 713. The push ring 71 is sleeved on the body 20 and fixed by pressing the rear section 713 closely against the assembling section 61 of the positioning ring 60. The end surface of the assembling section 61 of the positioning ring 60 cooperates with the rib 711 of the push ring 71 to define the annular groove 73. The push ring 71 is formed on the outer surface thereof with an anti-skid structure 714 for facilitating pushing of the control ring assembly 70 in the axial direction X.

The interior of the engaging member 72 is a two-step hole configuration consists of the assembling aperture 721 and the engaging aperture 722. The engaging member 72 is formed on the outer surface thereof with an annular recess 724 and sleeved on the body 20 in such a manner that the front section 712 of the push ring 71 is sleeved on and pressed against the annular recess 724, and the rear section 713 of the push ring 71 is sleeved on the assembling section 61 of the positioning ring 60.

When the quick release extension rod A is disengaged from the socket B, as shown in FIG. 4, the inserting rod 40 is pushed by the return member 30 to push the pin 74 against the inner end surface of the penetrating hole 25 adjacent to the engaging end 202 of the body 20, and the engaging member 72 is pushed by the four elastic members 80.

Figure 5A:
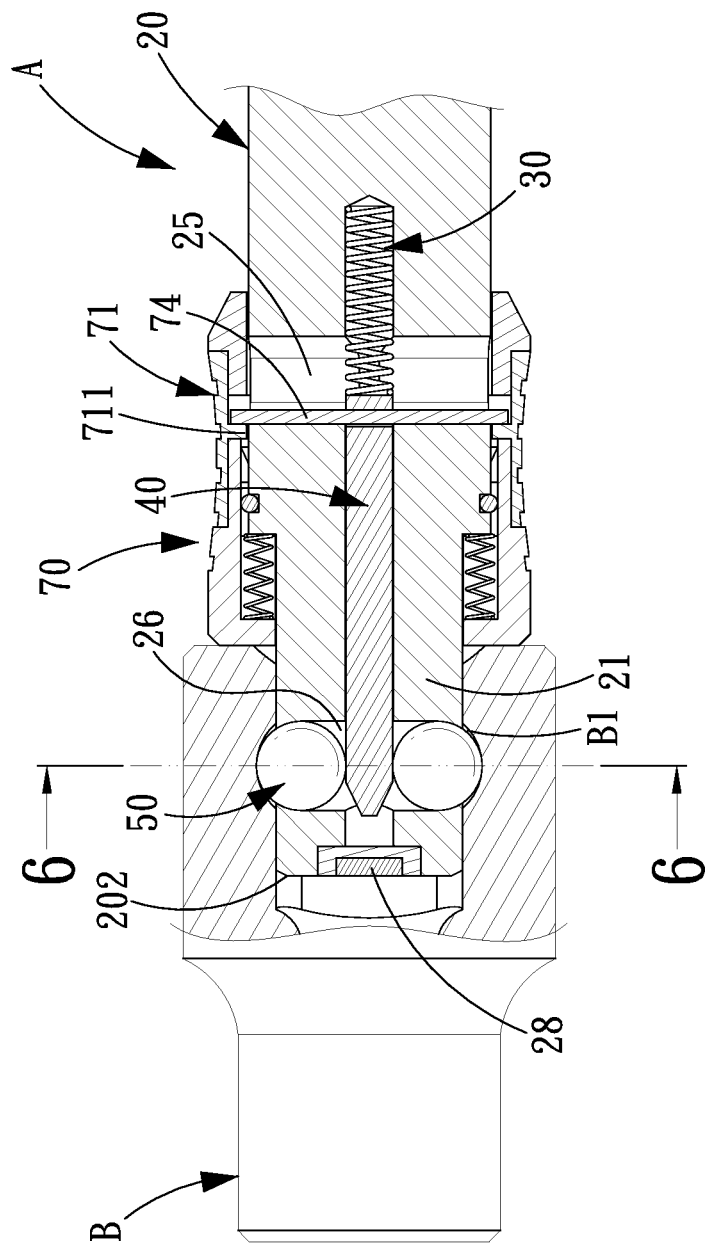
FIG. 5A is a cross sectional view showing that the quick release extension rod in accordance with the present invention is engaged with a socket.

When the quick release extension rod A is engaged with the socket B, as shown FIG. 5A, the inserting rod 40 is pushed to the through hole 26 by the return member 30, so that the two balls 50 are pushed by the inserting rod 40 to project out of the through hole 26 and engage in the engaging cavity B1 of the socket B, and thus the quick release extension rod A is connected to the socket B. At this moment, the socket B is abutted against the control ring assembly 70 to eliminate the axial interval S2 of the conventional quick release extension rod, the engaging member 72 slightly compresses the elastic members 80. Meanwhile, the inserting rod 40 is pushed by the return member 30 to push the pin 74 against the inner end surface of the penetrating hole 25 adjacent to the engaging end 202 of the body 20, and both ends of the pin 74 are pressed against the rib 711 of the push ring 71.

Figure 5B:
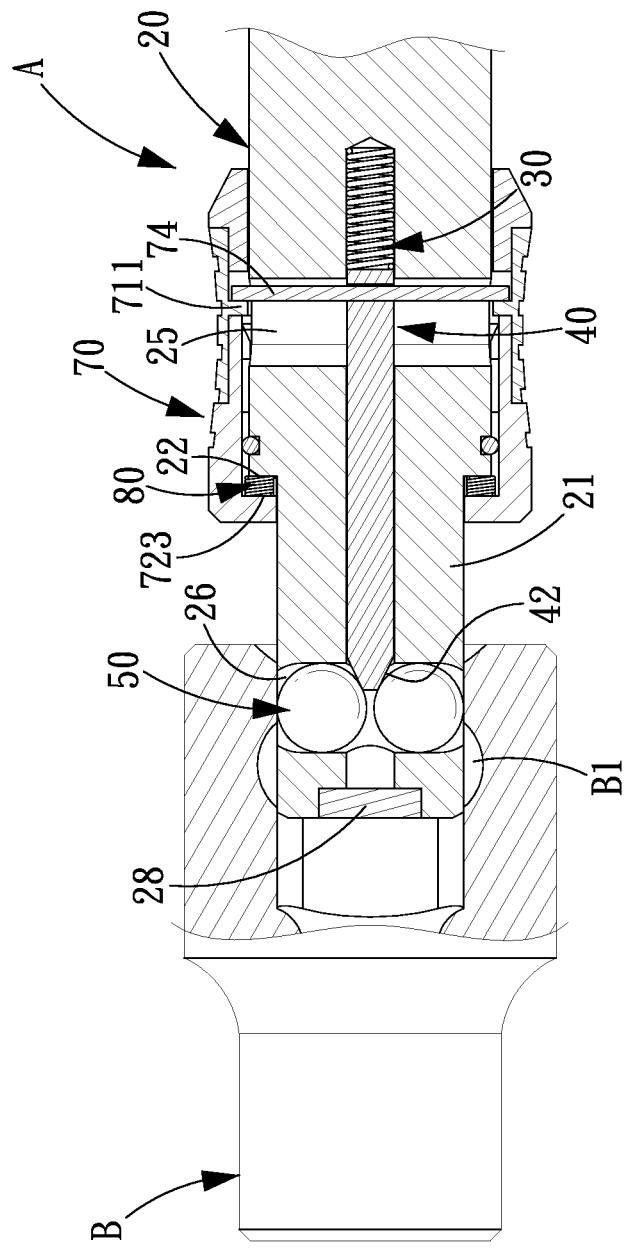
FIG. 5B is a cross sectional view showing that the quick release extension rod in accordance with the present invention is disengaged from the socket.

Referring then to FIG. 5B, when the control ring assembly 70 is pushed toward the driving end 201 of the body 20, the rib 711 of the control ring assembly 70 pushes the pin 74 to another end surface of the penetrating hole 25 adjacent to the driving end 201 of the body 20. At this moment, the four elastic members 80 are compressed by the bottom of the receiving grooves 723 of the control ring assembly 70 and the shoulder portion 22 of the body 20, and the inserting rod 40 moves inward to press the return member 30. Consequently, the two balls 50 are retracted from the engaging cavity B1 of the socket B and into the through hole 26 of the body 20 and finally abutted against the conical surface 42 of the inserting rod 40, so that the socket B is disengaged from the connecting head 21 of the quick release extension rod A.

Figure 6:
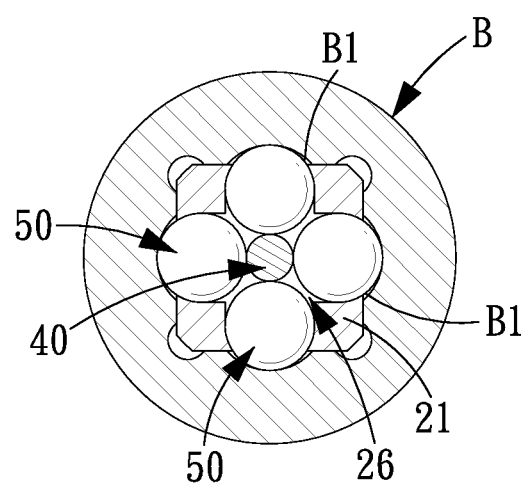
FIG. 6 is a cross sectional view showing a quick release extension rod in accordance with another embodiment of the present invention.

The positioning structure for a quick release extension rod in accordance with the present invention has the following advantages:

1. Through the cooperation of the two balls 50 and the inserting rod 40, the radial interval between the socket B and the connecting head 21 of the body 20 of the quick release extension rod A can be evenly distributed. Besides, as shown in FIG. 6, the connecting head 21 of the body 20 can be formed with two crossed through holes 26, and there are four balls 50 disposed at four ends of the two through holes 26, so that when the socket B rotates at high speed, the arrangement of an even number of balls 50 provides a symmetrical centre of gravity, thus reducing the possibility of the asymmetrical-center-of-gravity caused oscillation.

2. With the four elastic members 80 disposed between the receiving grooves 723 of the engaging member 72 of the control ring assembly 70 and the shoulder portion 22 of the body 20, the elastic members 80 keep pushing the control ring assembly 70 toward the engaging end 202 of the body 20 when the control ring assembly 70 is not pushed. Hence, after it is connected to the connecting head 21 of the body 20, the socket B can be abutted against the end surface of the engaging member 72 of the control ring assembly 70 to delimitate the axial interval, which further stabilize the center of gravity of rotation of the socket B while preventing the occurrence of oscillation of the socket.

Figure 7A:
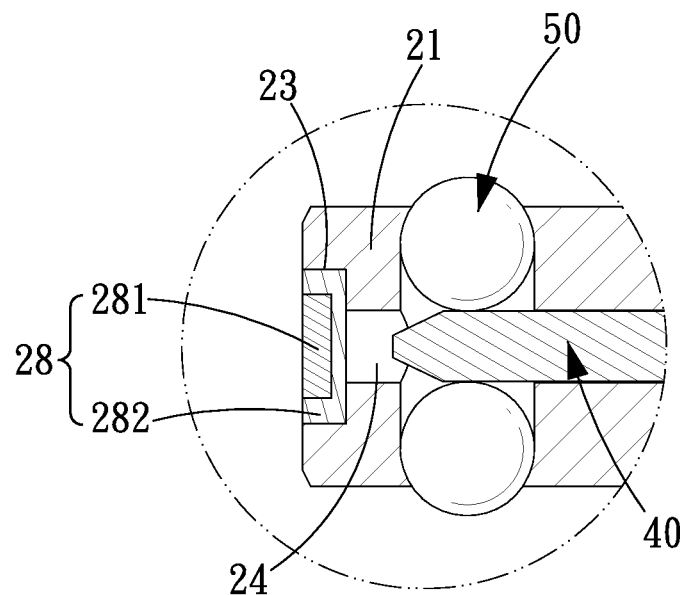
FIG. 7A shows an embodiment of the engaging hole of the connecting head of the quick release extension rod in accordance with the present invention.
Figure 7B:
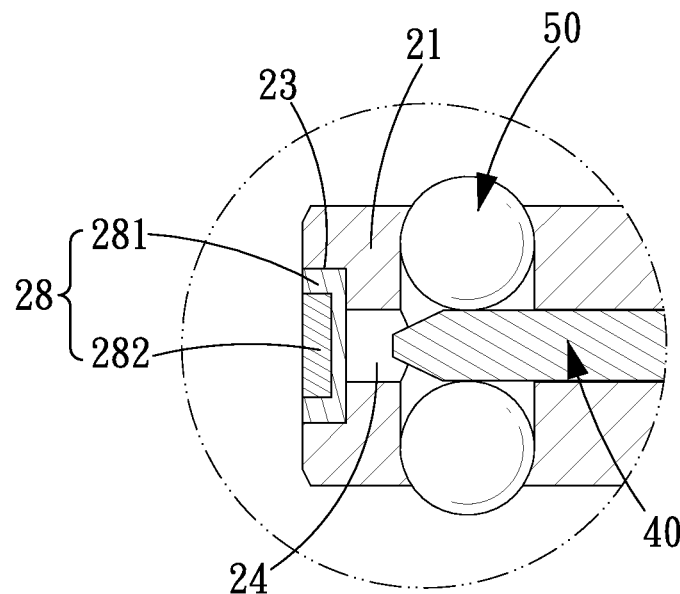
FIG. 7B shows another embodiment of the engaging hole of the connecting head of the quick release extension rod in accordance with the present invention.

3. As shown in FIG. 4, the engaging hole 23 of the body 20 is provided for insertion of a block 28, and the block 28 can be coated with color to indicate the specification and function of the quick release extension rod A, or can be a magnet to attract a work head, or the combination of a color identification block 281 and a magnet 282, as shown in FIGS. 7A and 7B.

While we have shown and described various embodiments in accordance with the present invention, it is clear to those skilled in the art that further embodiments may be made without departing from the scope of the present invention.

What is claimed is:

1. A quick release extension rod with a positioning structure comprising:

a body with a driving end and an engaging end and having an axial direction and a radial direction, the engaging end of the body being formed with a connecting head in the form of a quadrangle pillar, a middle portion of the body being circular-shaped in cross section and formed with a shoulder portion which is located between the connecting head and the body and connected to the connecting head, and in the connecting head being formed an assembling hole extending in the axial direction, in a middle of the body being formed a penetrating hole, in the connecting head being formed at least one through hole, and the penetrating hole and the through hole extending in the radial direction and being in communication with the assembling hole, between the shoulder portion and the penetrating hole of the body being formed an annular groove;

a return member disposed at a bottom of the assembling hole of the body;

an inserting rod having one end of the inserting rod formed with a radial hole and inserted in the assembling hole of the body in such a manner that the inserting rod is pressed against the return member and the radial hole is aligned with the penetrating hole of the body, another end of the inserting rod being formed with a conical surface which is inserted in the through hole of the body;

an even number of balls disposed in the through hole of the body and abutted against the inserting rod;

a positioning ring with one end formed with an assembling section being sleeved on the body, and the assembling section facing the engaging end of the body;

a control ring assembly, an interior of which being a two-step hole configuration consisting of an assembling aperture circular in cross section and an engaging aperture which is quadrangle-shaped to fit the connecting head and formed at an end of the assembling aperture, the engaging aperture being formed in an inner surface thereof with four receiving grooves extending in the axial direction, the control ring assembly being sleeved on the body in such a manner that an inner surface of the assembling aperture is abutted against an outer surface of the assembling section of the positioning ring, the inner surface of the assembling aperture being formed with a slanting rib located adjacent to the engaging aperture and an annular groove located adjacent to the positioning ring, a pin being inserted through the penetrating hole of the body and the radial hole of the inserting rod and having both ends received in the annular groove in such a manner that the shoulder portion of the body is stopped against a conjunction between the engaging aperture and the assembling aperture, and the connecting head is inserted in the engaging aperture of the control ring assembly;

four elastic members received in the four receiving grooves of the control ring assembly and pressed against the bottom of the receiving grooves; and a C-shaped retainer engaged in the annular groove of the body and located between the slanting rib and the engaging aperture in such a manner that the C-shaped retainer expands so as to press against an inner surface of the control ring assembly;

wherein the pin has both ends received in the annular groove, so that axial displacement of the positioning ring and the control ring assembly causes movement of the pin, wherein the pin pushes the inserting rod, in which the pin being inserted, to move along the assembling hole of the body to push against or away from the balls, so as to make the balls retract into or project out of the through hole, wherein the return member and the elastic members bias the control ring assembly and the inserting rod towards a position in which the balls are projected outwardly.

2. The quick release extension rod with a positioning structure as claimed in claim 1, wherein the assembling section of the positioning ring is in the form of an annular recess.

3. The quick release extension rod with a positioning structure as claimed in claim 1, wherein the control ring assembly comprises a push ring and an engaging member;
the push ring includes a rib formed in an inner surface thereof to divide an inner surface of the push ring into a front section and a rear section, the push ring is sleeved on the body and fixed thereon by pressing the rear section against the assembling section of the positioning ring, an end surface of the assembling section of the positioning ring cooperates with the rib of the push ring to define the annular groove of the control ring assembly; and
an interior of the engaging member is a two-step hole configuration consisting of the assembling aperture and the engaging aperture of the control ring assembly, the engaging member is formed on an outer surface thereof with an annular recess and sleeved on the body in such a manner that the front section of the push ring is sleeved on and pressed against the annular recess.

4. The quick release extension rod with a positioning structure as claimed in claim 3, wherein the assembling section of the positioning ring is in the form of an annular recess, the control ring assembly is sleeved on the body in such a manner that an inner surface of the assembling aperture is abutted against an outer surface of the assembling section of the positioning ring.

5. The quick release extension rod with a positioning structure as claimed in claim 3, wherein the push ring is formed on an outer surface thereof with an anti-skid structure.

6. The quick release extension rod with a positioning structure as claimed in claim 1, wherein an engaging hole is formed in the end surface of the connecting head for insertion of a block which consists of an identification block and a magnet, and the assembling hole is formed at a bottom of the engaging hole.

7. The quick release extension rod with a positioning structure as claimed in claim 1, wherein the number of the balls is two, the body is formed with one through hole, and the balls are disposed at both ends of the through hole.

8. The quick release extension rod with a positioning structure as claimed in claim 1, wherein the number of the balls is four, the body is formed with two through holes, and the balls are disposed at four ends of the two through holes.

* * * * *